Aug. 27, 1935.   C. G. BOONE   2,012,715
PIPE CLEANING MACHINE
Filed Feb. 8, 1934
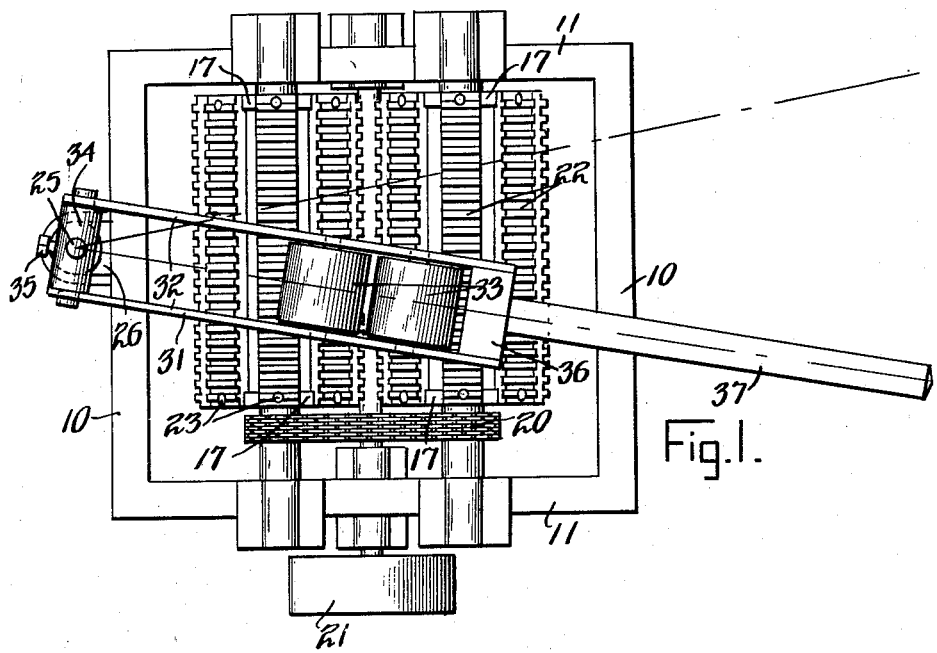
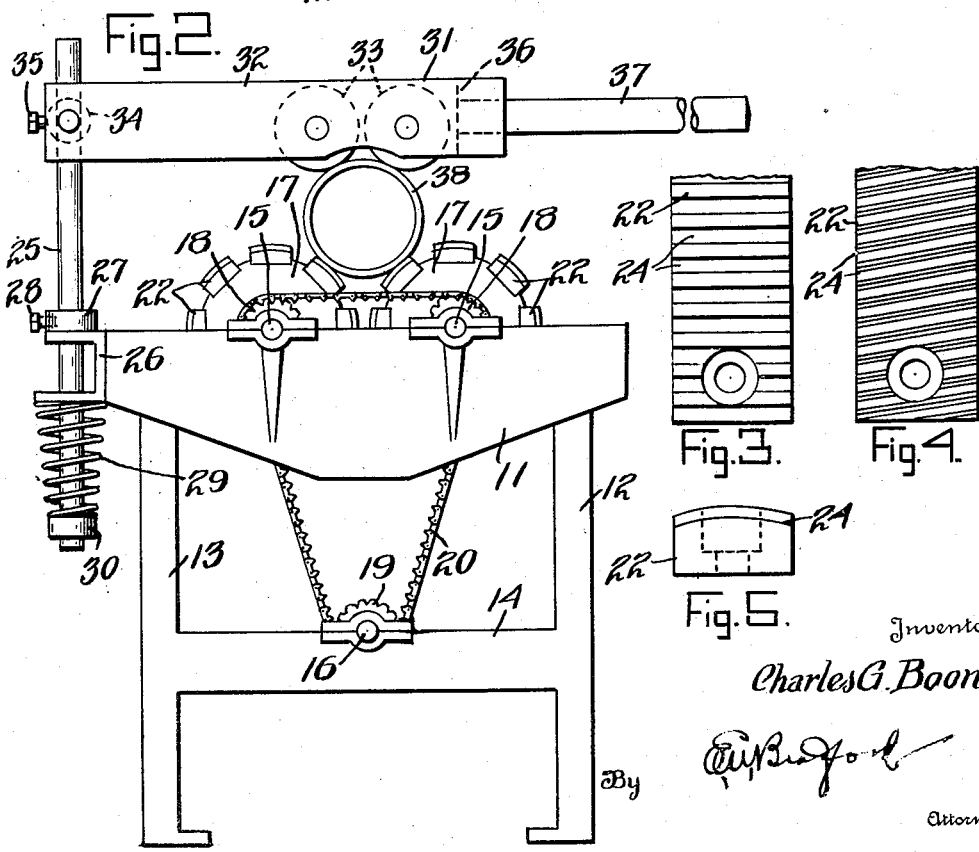
Inventor
Charles G. Boone
By
Attorney Patented Aug. 27, 1935

2,012,715

UNITED STATES PATENT OFFICE 2,012,715

PIPE CLEANING MACHINE

Charles G. Boone, Okmulgee, Okla., assignor, by mesne assignments, to New Deal Specialty Co., Inc., Okmulgee, Okla., a corporation of Oklahoma Application February 8, 1934, Serial No. 710,362

4 Claims. (Cl. 15—104.04)

This invention relates to pipe cleaning machines and the object of the invention is to provide a machine of a construction and arrangement whereby it may be used to readily and quickly remove scale, dirt or other foreign accumulation from the outside surface of a pipe or tube by means of rotatable cutting surfaces which impart rotary motion to the pipe or tube being cleaned.

A further object is to provide a machine which may be easily transported, one that may be adjusted to accommodate various size work and which is provided with a novel arrangement and mounting of the cutting surfaces.

The invention contemplates a pipe cleaning machine which is an improvement over machines heretofore in use in that it can be operated with greater facility and it is of a simpler and more unitary construction, it being an object to eliminate complicated mechanism and to provide the simplest mechanism possible for performing as expeditiously as possible the function for which the machine is designed and with minimum discomfort to the operator.

Other advantages and objects will become apparent as the description proceeds.

Referring to the accompanying drawing, which is made a part hereof and on which similar reference characters indicate similar parts, Figure 1 is a plan view of the machine, Figure 2, an end elevation of the machine with a section of pipe in operative position, Figure 3, a partial plan view of a blade used on the machine, Figure 4, a partial plan view of a modified form of blade, and Figure 5, an end elevation of the blade shown in Figure 3.

In the drawing reference characters 10 and 11 indicate the sides and ends of the base or framework of the machine which is provided with legs 12 and 13 formed integral therewith or attached at the corners. The legs 12 and 13 are provided with cross-members 14 positioned below the ends 11. The ends 11 and the cross-members 14 are provided with bearing surfaces in which the shafts 15 and 16 respectively are mounted in parallel relation to each other. The ends of the shafts 15 are provided with cast heads 17 fixed thereto adjacent the ends 11. Gears 18 and 19 are secured at one end of the shafts over which an endless chain 20 is mounted. The shaft 16 is driven by means of a pulley 21 secured to one end.

A series of spaced blades 22 are mounted on the heads 17 being positioned longitudinally of the shafts 15. The blades are bolted in place by head screws 23 or similar fastening means which are countersunk below the grooved or threaded cutting surfaces 24 of the blades such being shown in Figures 3 and 4.

The blades 22 are spaced apart on the heads to permit rust, scale, dirt, etc. to fall through the machine as the blades contact the surface being cleaned.

A vertically positioned shaft 25 is mounted in a bracket 26 on the side 10 and is held against downward displacement by the collar 27 and set screw 28. A spring 29 is positioned below the bracket around the shaft 25 and is maintained thereon by a stop 30 secured in any suitable manner to the lower end of the shaft 25. The spring serves as a shock absorber for an operating lever 31 when the machine is in operation.

The lever 31 comprises a pair of spaced plates 32 with a pair of spaced smooth rollers 33 positioned therebetween which rotate on two shafts independent of each other. One end of the plates is pivotally positioned on a cross-member 34 which is mounted on the upper end of the shaft 25 and held in position by the set screw 35. The other end of the plates is connected by a cross-member 36 to which a handle 37 is fixed. The lever 31 may be oscillated since the shaft 25 is free to turn in the supporting bracket 26. The handle may be moved vertically since it is pivotally attached to the cross-member 34.

The operation of the machine is as follows:

The lever 31 is adjusted vertically on the shaft and the handle is raised to receive a pipe or tube 38 placed on the blades 22. The handle is then moved so that the rollers 33 engage the upper surface of the pipe. The pulley is driven which transmits the motion to the blades through the chain and gears above described. The friction of the blades against the pipe causes it to turn, the degree of friction being determined by the amount of pressure applied to the handle remains exactly transverse of the work, the pipe will continue to turn along one surface. By moving the handle to the right or left, the pipe will be fed in a direction parallel to the shafts 15 as desired.

The pressure necessary to be applied to the handle and the oscillation of the operating lever depends entirely on the condition of the surface being cleaned.

In the description reference has been made to pipes or tubes, however, it should be clearly understood that the machine may be used for cleaning any smooth cylindrical surface.

It is obvious that the machine so constructed and mounted can be made stationary for yard or factory use yet portable for easy transportation for job work. The machine is simple to operate, yet efficient and economical for the purpose to which it is intended to be used.

By cutters as referred to in the claims is meant rotary cleaning elements of the character to produce rotation of the pipe to be cleaned by engagement therewith, the expression being intended to cover brushes of sufficient stiffness to produce the necessary rotation.

Having thus fully described my said invention, what I claim as new and desire to secure by Letters Patent, is:

1. A pipe cleaner comprising substantially parallel horizontally disposed spaced cutters to receive a pipe to be cleaned, means for supporting and driving said cutters, an upright elongated pivot positioned laterally of said cutters and means for resiliently mounting said pivot for vertical movement in said supporting means, a lever vertically adjustable on said pivot and swingable about said pivot in a substantially horizontal and a substantially vertical plane, roller means on said lever intermediate its ends for engaging along the pipe whereby downward pressure on the lever adjacent its free end will press the pipe against the cutters and swinging of the lever in a horizontal plane will cause the pipe to be advanced over said cutters.

2. A pipe cleaning machine comprising a frame, a vertical pivot element mounted in said frame, a cross-member on said pivot element mounted to swing in a horizontal plane, means to vertically adjust said cross-member on said pivot element, a lever pivoted adjacent one end of said cross-member to swing in a substantially vertical plane, substantially horizontal and parallel roller means and cutter means for engaging on opposite sides of a pipe to be cleaned, one of said roller means and said cutter means mounted in said frame laterally of said pivot and the other mounted on said lever intermediate its ends, and means to drive one of said roller means and cutter means, the arrangement being such that downward pressure on the lever adjacent its free end will press the pipe against the cutters and swinging of the lever in a horizontal plane will cause the pipe to be advanced over said cutters.

3. A pipe cleaning machine comprising a frame, a substantially vertically disposed pivot element resiliently mounted adjacent its lower end in said frame, a cross-member on said pivot element mounted to swing in a horizontal plane, means to vertically adjust said cross-member on said pivot element, a lever pivoted adjacent one end on said cross-member to swing in a substantially vertical plane, substantially horizontal and parallel roller means and cutter means for engaging along opposite sides of a pipe to be cleaned, one of said roller means and said cutter means mounted in said frame laterally of said pivot and the other mounted on said lever intermediate its ends, and means to drive one of said roller means and cutter means, the arrangement being such that downward pressure on the lever adjacent its free end will press the pipe against the cutters and swinging of the lever in a horizontal plane will cause the pipe to be advanced over said cutters.

4. A pipe cleaner comprising substantially parallel horizontally disposed cutters to receive a pipe to be cleaned along the same, means for supporting and driving said cutters, a lever pivoted at one side of said cutters for swinging movement in a substantially horizontal plane and in a substantially vertical plane, and roller means whose axis of rotation is immovable with respect to said lever and mounted on said lever intermediate its ends for engaging along the pipe whereby downward pressure on the lever will press the pipe against the cutters and swinging of the lever in a horizontal plane will cause the pipe to be advanced over the cutters.

CHARLES G. BOONE.